UNITED STATES PATENT OFFICE.

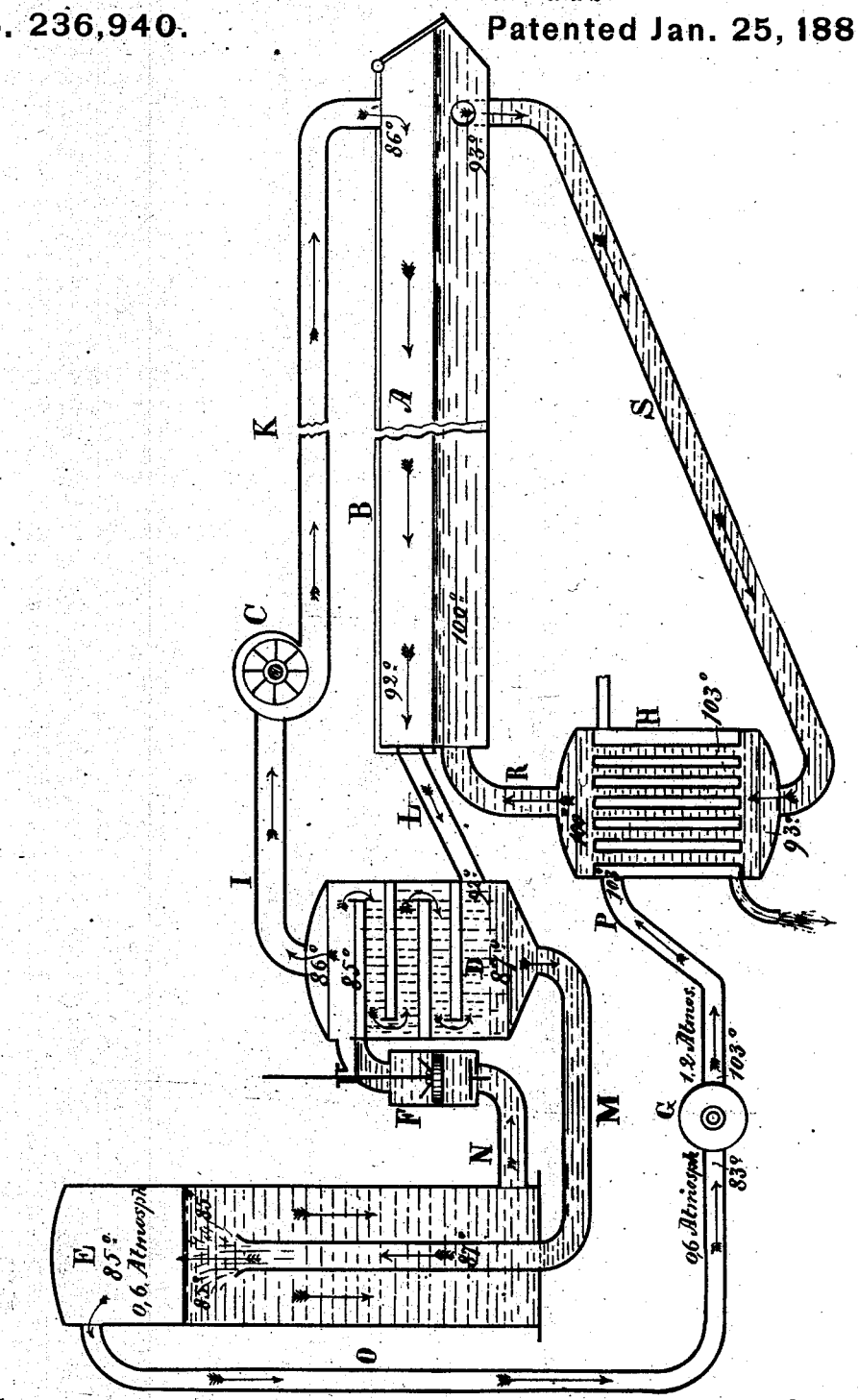

JULES L. FAESCH, OF GENEVA, SWITZERLAND, ASSIGNOR TO SOCIÉTÉ ANONYME POUR L'EXPLOITATION DES BREVETS PICARD, OF SAME PLACE.

APPARATUS FOR EVAPORATING SOLUTIONS IN CONTACT WITH AIR OR OTHER GAS.

SPECIFICATION forming part of Letters Patent No. 236,940, dated January 25, 1881.

Application filed August 10, 1880. (No model.) Patented in France June 15, 1880.

*To all whom it may concern:*

Be it known that I, JULES LOUIS FAESCH, of Geneva, in the Republic of Switzerland, have invented certain Improvements in Apparatus for Evaporating Solutions in Contact with Air or other Gas, of which the following is a specification.

The present invention concerns the process of evaporation in contact with air, so frequently resorted to.

When salt must be obtained in large crystals, it can only be so obtained on the surface of a liquid evaporated in contact with air without boiling. In ordinary salt-evaporating pans brine is evaporated in contact with air, and the vapor produced by burning fuel under the pan passes off into the atmosphere. The heat contained in the vapor which is disengaged is thus lost.

To utilize the greater part of the heat contained in the vapor disengaged from a liquid which is being evaporated, it is necessary either to conduct this vapor into contact with the sides of a vessel containing a liquid which evaporates at a lower temperature, (this is the principle of the apparatus known as "multiple-effect apparatus" employed in sugar-works and other industries,) or else to reheat this vapor by compression. It can then even keep up the temperature of the liquid from which it was disengaged. These processes are both known; but if applied to the treatment of a mixture of air and vapor they present difficulties and sources of loss which render their use of very little advantage, and even impossible. The first process is used at some salt-works, where a small portion of the vapor admixed with air is utilized under a second pan called "vapor-pan," in which the liquid has only to be warmed to a lower temperature than that of the mixture of air and vapor. The temperature of the mixture is lowered by contact with the sides of the pan—part of the vapor condenses and yields its heat to the sides of the pan and the liquid it contains—but as the lowering of temperature sustained by the mixture is small, only a small portion of the vapor it contains is condensed, while the greater portion, instead of being utilized, remains mixed with the air, which must necessarily be passed away. This is the cause of the small yield of the vapor-pans now used. The same cause would have to be encountered in any other arrangement of multiple-performance apparatus treating a mixture of air and vapor, and would prevent any advantageous result being obtained from it. The treatment of a mixture of air and vapor by compression would be still less economical. The presence of air would necessitate a loss of a large excess of mechanical force over what would be necessary when treating pure vapor.

The process which it is now sought to protect has for its object to permit pure vapor to be obtained, even when the evaporation takes place in presence of air. The process is as follows: Over an ordinary salt-pan a current of air is passed, which becomes charged with the vapor of water by passing over the surface of liquid kept at a certain temperature. At the outlet from the pan this air, nearly if not entirely saturated with vapor, is conducted through a shower of liquid which is at a lower temperature than the air charged with vapor coming from the pan. This colder rain of liquid will lower the temperature of the mixed air and vapor, and part of the water-vapor will be condensed. If the air, deprived by condensation of a portion, more or less considerable, of the vapor which it has taken from the solution, were allowed to escape into the atmosphere, the vapor still contained in the evacuated air would be lost. To avoid this loss, the air which has been slightly cooled and deprived by its cooling of a portion of the moisture which it contained may be again conducted over the pan, be thereby warmed, and caused to take up a fresh charge of vapor. The intermediate liquid, which is made to fall in a rain, will have condensed some of the vapor, and in doing so will have absorbed the latent heat of this vapor. It is thereby warmed, and at the same time increased in volume by the quantity of water which it has condensed. If, now, a quantity of vapor equal to that which has been condensed is withdrawn from the intermediate liquid, the intermediate liquid will be brought back exactly to its original state both as regards volume and temperature. The operation can then be recommenced, and the intermediate liquid be used over and over again to condense vapor out of its admixture with air, and to produce a quantity of vapor equal to that which it has condensed.

It is easy to obtain the vapor disengaged from the intermediate liquid free from air, and so obtain pure vapor—that is to say, without admixture of air. This vapor can then be used for producing a new evaporation by the employment either of the principle of multiple effects or of compression of the vapor.

In place of the intermediate liquid being made to fall as a rain, it might be brought into contact with the saturated air in any other manner. This contact need not also be direct. The intermediate liquid might be made to circulate through tubular or other surface-condenser. In this case the vapor condensed in the condenser would have to be separately drawn off.

The main characteristics of the above process consist in evaporating a solution in contact with air, in condensing the vapor so obtained admixed with air by the contact of this mixture with an intermediate liquid, and in obtaining free from air the vapor of this liquid, so obtaining pure vapor possessing all the heat of the vapor produced admitted with air; also, preferably, in effecting the return of the air so partially deprived of vapor over the surface of the evaporating-pan and maintaining a constant circulation. The heat of the pure vapor may be utilized in any known way, either by the application of the principle of compression or of multiple effect, or in other suitable manner.

The annexed drawing will give a clear notion of a means of carrying out the invention above described, and of the successive modifications that take place in the degree of heat of the fluids. Such quotations, however, are not meant to define precisely the conditions of temperature needful for conducting the process, but merely to illustrate the relative effects which it is expected to produce.

A is the evaporating-pan, made of any suitable material not being acted directly upon by fire; B, the cover to said pan, also of any suitable material.

C is the fan used for actuating, when desired, the circulation of the air from the outlet of the cover B to the shower apparatus D, and thence back to the inlet of cover B through pipes L I K.

D is the shower apparatus, provided with a number of trays bored with holes, so as to allow water from the top to fall in a state of suitable division, and to meet the ascending stream of air from the cover B, introduced at the bottom of said apparatus through pipe L.

E is the vessel holding what I call the "intermediate liquid," the bottom of which communicates through pipe N with the top of shower apparatus D, and inside which rises up, near to the level of the liquid contained, a pipe, M, issuing from bottom of said apparatus D, thus allowing continuous circulation, as shown by the arrows. A pump, F, acting over a valve properly arranged, actuates the circulation between the two vessels.

From the top of vessel E starts a pipe, O, leading to the top of apparatus H, where is effected the heating of the brine or other solution to be evaporated. On said pipe O is placed a double-action pump, G, which causes the steam from top of vessel E to be fed into the tubular or other heating apparatus under a pressure which raises its temperature. On the other hand, a circulation of the salt solution is maintained between the evaporating-pan A and the heater H, through pipes R and S, the heating in H causing a permanent siphon circulation, which constantly renews the evaporated bath and keeps up its temperature.

The process acts as follows: On leaving the evaporating apparatus the air charged with the vapor from the evaporation meets the shower, which, being colder than the air, discharges it readily of the vapor it contains. The air is then returned slightly cooled, and almost entirely deprived of its moisture, to the evaporating-pan, where it is again warmed and takes up a fresh charge of vapor. Meanwhile, the intermediate liquid, having taken up the vapor from the air, condenses it and absorbs its latent heat, and, being forced back to the upper part of the vessel E, as shown, gives out from the top of the said liquid a quantity of steam precisely equal to that which it has taken up. Thus the vapor from the evaporation is extracted from the air and collected to serve any heating or other purposes.

In the present case the steam is shown as being used for heating, under pressure, the salt solution to be evaporated, and the solution is shown being circulated; but this is no part of the invention.

I must also remark that although I find it advisable to have the same air used over and over again, as represented, the slight quantity of vapor that it retains being thus preserved, yet this part of the apparatus may also be dispensed with, and the mode of actuating the circulation may also be varied. Also, the means of causing the intermediate liquid to intimately mingle with the moist air may be varied. Finally, the annexed drawing is not meant to give any scale or proportion in reference to the apparatus, which will be soon settled in practice, according to quantities to be operated upon, and to the nature of the solution.

The above process, which admits of obtaining a vapor free from air, although the evaporation which has produced it took place in the presence of air, constitutes a new and important manufacturing process susceptible of numerous applications, not only for the manufacture of large-grained salt, but also for the evaporation of any other liquid, whether it is required to obtain from it a solid residue or to concentrate the liquid, or even if the object is to collect condensed vapor as a liquid which has been rectified or distilled in presence of air or other gas.

Having fully described my invention, what I desire to claim and secure by Letters Patent is—

1. The process hereinbefore described for utilizing the latent heat of an admixture of air and vapor, which consists in first depriving the mixture of said latent heat by means of a cooling and absorbing agent; secondly, in eliminating from the latter the latent heat absorbed and increasing the temperature of the latter by compression and utilizing the same for heating purposes, substantially as described, and for the purposes specified.

2. The process of evaporating liquids by contact with atmospheric air, which consists, first, in eliminating the vapor from the charged air by means of a cooling and absorbing agent, and employing the air so deprived of heat and moisture in the process of evaporation; secondly, eliminating the latent heat absorbed by the cooling agent and increasing its temperature by compression; thirdly, utilizing the latent heat so eliminated and increased in temperature to heat the liquid to be evaporated, substantially as hereinbefore described, for the purpose specified.

3. In an apparatus for evaporating liquids, more especially adapted for evaporating brine in salt-works, the combination of an evaporating-pan, a cooling-vessel, and means, substantially as described, for producing a continuous circulation of the combined air and vapors, for cooling said air by depriving it of its latent heat and moisture, and reconducting the air so cooled and dried to the evaporating-pan, substantially as and for the purpose specified.

4. In the evaporating apparatus hereinbefore described, the combination, with the evaporation-pan, the cooling-vessel, the fan, and their respective connections L I K, of a liquid-reservoir, an intermediate suction-pump, and the connections N M, arranged and operating substantially as described, for the purpose specified.

5. In an evaporating apparatus, the combination, with an evaporating-pan, a cooling-vessel, an intermediate suction-fan, a liquid-reservoir, a suction-pump between the latter and cooling-vessel, and the connections I K L M N, of a heater, and a force-pump between said heater and liquid-reservoir, and the connecting-pipes O P R S, arranged and operating substantially as and for the purposes specified.

JULES LOUIS FAESCH.

Witnesses:
JULES HENRI WEIBEL,
LYELL T. ADAMS.